United States Patent [19]

Takezawa et al.

[11] 3,859,458

[45] Jan. 7, 1975

[54] RECEIVER FOR RECEIVING A STILL PICTURE BROADCASTING SIGNAL

[75] Inventors: Teruhiro Takezawa; Michio Masuda, both of Tokyo; Hiroaki Nabeyama; Katsuo Mohri, both of Yokohama; Masaaki Fukuda; Tatsuo Kayano, both of Tokyo; Akio Yanagimachi, Kawasaki; Hisakichi Yamane, Tokyo; Eiichi Sawabe, Tokyo; Takashi Uehara, Tokyo; Takehiko Yoshiho, Yokohama, all of Japan

[73] Assignees: Hitachi Limited; Hitachi Electronics, Ltd.; Nippon Hoso Kyokai, all of Tokyo, Japan

[22] Filed: Aug. 30, 1973

[21] Appl. No.: 393,162

[30] Foreign Application Priority Data

Sept. 4, 1972 Japan .............................. 47-87959

[52] U.S. Cl. .......................... 178/5.8 R, 178/DIG. 23

[51] Int. Cl. ................................................ H04n 5/44

[58] Field of Search ............ 178/5.6, 5.8 R, DIG. 23

[56] References Cited

UNITED STATES PATENTS 3,493,674 2/1970 Houghton ............................ 178/5.6

*Primary Examiner*—Robert L. Richardson

*Attorney, Agent, or Firm*—Stevens, Davis, Miller & Mosher

[57] ABSTRACT

A receiver for receiving a still picture broadcasting signal consisting of a composite signal comprising a video signal representing a plurality of still pictures, an audio signal in the form of a pulse code modulated and time division multiplexed signal representing a plurality of sounds, a control signal including information for processing said video and audio signals at a receiver end and a synchronizing signal necessary for reproducing said video, audio and control signals at the receiver end, said signals being arranged in a predetermined sequence at a period of a predetermined time interval, said receiver extracting said control signal and desired still pictures and sounds being accurately extracted and displayed with the aid of the extracted control signal. Said control signal comprises a program material identification signal consisting of a video identification number for identifying a video signal of each still picture and of an audio channel number identifying an audio signal inserted in each audio channel, a first control signal for selecting a particular combination from a number of combinations of said still pictures and sounds and controlling progress of reproduction in accordance with a predetermined rule and a second control signal for denoting a combination of a still picture and a sound inserted in a channel, which combination constitutes a set of program material.

5 Claims, 20 Drawing Figures

RECEIVER FOR RECEIVING A STILL PICTURE BROADCASTING SIGNAL

BACKGROUND OF THE INVENTION

The present invention relates to a receiver for receiving a composite signal which comprises a video signal representing a plurality of still pictures, an audio signal inserted in a plurality of multiplexed channels and representing a plurality of sounds, a control signal for processing at a receiver end said video and audio signals and a synchronizing signal necessary for reproducing said video, audio and control signals at the receiver end, all of said video, audio, control and synchronizing signals being arranged in a predetermined sequence at a period of a predetermined time interval.

More particularly the present invention relates to a receiver for receiving the above mentioned composite signal including the control signal which comprises a program material identification signal for identifying a video signal of each still picture and an audio signal inserted in each channel, a first control signal for selecting a particular program material from a number of program materials each consisting of a pair of still picture and sound and for controlling progress of reproduction in accordance with a predetermined rule and a second control signal for denoting a combination of a still picture and a sound forming a set of program material, said receiver selectively extracting said control signals from the composite signal and reproducing still pictures and sounds required by a receiver or viewer or still pictures and sounds predetermined in accordance with response of the receiver or viwer.

In a conventional television broadcasting since information of motion pictures is treated, only one kind of information is transmitted at one time in a bandwidth of 6 MHz. Therefore in order to transmit many kinds of information signals, these information signals must be transmitted in a divided time intervals and thus the receiver or viewer must await until a desired information signal is transmitted. That is to say it is impossible for the receiver to obtain the desired information signal at any desired time.

At the present an educational program has been transmitted by the television broadcasting, but in this case since the progress of learning is effected at a rate fixed by a broadcasting station, the learning rate for all receivers or students is same. Moreover the television broadcasting is of a one-way or open-ended transmission from the single broadcasting station to a number of the students and thus the program is advanced in regardless of a fact whether or not the students understand its content.

In the conventional television broadcasting for transmitting motion pictures a signal representing 30 pictures is transmitted in 1 second. However, in some programs sufficient information can be conveyed by transmitting only still pictures in dependence on the content of the program. Particularly in an educational program it is possible to communicate a large amount of instruction content by transmitting the still pictures.

In the still picture transmission system it is sufficient to transmit a still picture video signal once and at a receiver end the incoming still picture video signal is stored in a memory and the stored video signal is repeatedly reproduced to obtain the still picture. Thus in case of transmitting the still picture video signal as a video signal similar to the conventional television signal, it is possible to transmit 30 different still pictures in 1 second. In order to transmit a large amount of information it is necessary to transmit sound information in addition to the still pictures and for this purpose different sounds each relating to each still picture must be simultaneously transmitted. If the still pictures and sounds are transmitted in the same bandwidth as that of the conventional television broadcasting, a number of sounds can be transmitted by decreasing the number of still pictures which are transmitted in one second. For instance, when the video signal is transmitted at a rate of 10 still pictures per 1 second and the audio signal is allotted to the remaining period of said 1 second to form a composite signal and the composite signal is repeatedly transmitted at a period of 5 seconds, the video signal of 50 different still pictures and the audio signal of more than 50 channels, each having a time length of at least 5 seconds can be transmitted. Moreover when a still picture and a sound are combined to form a set of information content, it is possible to transmit different sets of information content of 50 channels in the bandwidth of the television broadcasting signal and thus various kinds of requirements of receivers or viewers may be simultaneously satisfied. Awaiting time or access time of the receiver for obtaining desired information is 5 seconds in the above example. If a much longer awaiting time is allowed, the kinds of information may be extremely increased.

These various kinds of the video and audio signals are transmitted with being combined to form a number of sets of information content, instead of transmitting them independently and at the same time there is further transmitted an auxiliary signal for controlling at the receiver end reproduction of these sets of information content in accordance with a predetermined rule by means of response of the receiver or viewer, then it is possible to effect programmed instruction.

The receiver according to the invention is particularly suitable for receiving the signal containing a large amount of information of, for example programed instruction. An example of a transmission system for transmitting such a signal is a still picture transmission system. In the still picture transmission system a video signal representing a plurality of still pictures, an audio signal in the form of pulse code modulated and time division multiplexed signal and representing a plurality of sounds relating to said still pictures, a control signal comprising information for treating at the receiver end said video and audio signals and a synchronizing signal necessary for reproducing at the receiver end said video, audio and control signals are arranged in a predetermined sequence at a period of a predetermined time interval. In an embodiment of the still picture transmission system the video signal expressing one still picture is transmitted during a time interval of 1/30 seconds similar to one frame of the conventional television signal and the audio signal is transmitted during a time interval of 1/15 seconds. These video and audio signals are transmitted in turns. In one video signal transmission period in every 1 second there is transmitted a part of the control signal instead of the video signal. The control signal comprises a program material identification signal consisting of a video identification signal or number for identifying each of a plurality of the still pictures and an audio channel signal or number for identifying each of the audio signals inserted in each of the multiplexed audio channels, a second control signal for denoting a combination of a still picture and a sound constructing a set of program material and a first control signal for selecting desired program material from a number of the program materials in accordance with a predetermined rule to progress the reproduction at the receiver end. The first control signal is inserted in the control signal transmission period of 1/30 seconds at a rate of once per second. The second control signal is inserted in vertical blanking periods of the video and control signal transmission periods.

The program material identification signal is inserted in head portions of each video signal and audio signal inserted in each channel. Therefore in order to reproduce desired video and audio signals from the still picture broadcasting signal it is necessary to detect and selectively extract positions in which said control signal is inserted.

SUMMARY OF THE INVENTION

The present invention has for its object to provide a novel and effective receiver which is particularly suitable for receiving the still picture broadcasting signal.

It is another object of the invention to provide a receiver which can selectively reproduce any one set of the video and audio signals from a number of sets of the video and audio signals.

It is still another object of the invention to provide a receiver for carrying out programed instruction with receiving the still picture broadcasting signal.

It is still another object of the invention to provide a receiver which detects and extracts the control signal from the still picture broadcasting signal to generate a signal for extracting given video and audio signals and reproduces the desired video and audio signals on the basis of said signal.

According to the present invention a receiver for receiving a composite signal comprising a video signal representing a plurality of still pictures, an audio signal in the form of a pulse code modulated and time division multiplexed signal and representing a plurality of sounds, a control signal including information for processing at a receiver end said video and audio signals, a synchronizing signal necessary for reproducing said video, audio and control signals at the receiver end, said signals being arranged in a predetermined sequence at a period of a given time interval, comprises an operation panel operated for selecting still pictures and sounds to be reproduced, index denoting means for denoting an index by operating said operation panel, means for selectively extracting from the still picture broadcasting signal first and second control signals having the same index as that denoted by said index denoting means, storage means for storing said extracted first and second control signals, means for extracting and reproducing given still picture and sound having a video identification number and an audio channel number, respectively denoted by said second control signal stored in said storage means, means for selecting one of indexes included in the first control signal stored in said storage means by means of a command from said operation panel operated in accordance with said reproduced still picture and sound and supplying said selected index to said index denoting means and sequence control means for operating the above mentioned means in a predetermined sequence.

According to the present invention it is possible to effect programed instruction by means of a one-way transmission which programed instruction is similar to that carried out by a two-way transmission.

BRIEF EXPLANATION OF THE DRAWINGS

Now the present invention will be explained in detail with reference to the accompanying drawings in which:

FIG. 17 shows an addressing circuit and signal waveforms for explaining the operation thereof, in which FIG. 17*a* is a block diagram of the addressing circuit, and FIGS. 17*b* to 17*k* are signal waveforms for explaining the operation of the circuit shown in FIG. 17*a;*

DESCRIPTION OF THE PREFERRED EMBODIMENTS

An example of a still picture broadcasting signal which is preferably received by the receiver according to the present invention will be explained with reference to FIGS. 1 to 9.

Figure 1:
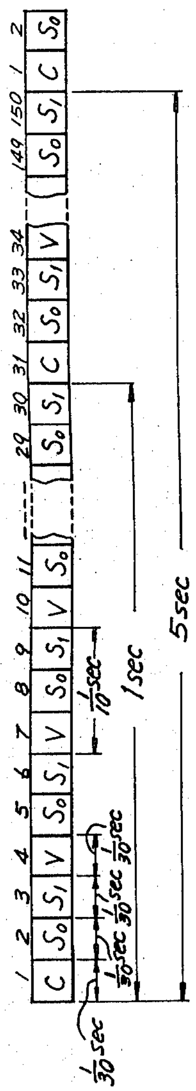
FIG. 1 is a signal format illustrating an example of a signal allocation of the still picture broadcasting signal.
Figure 2:
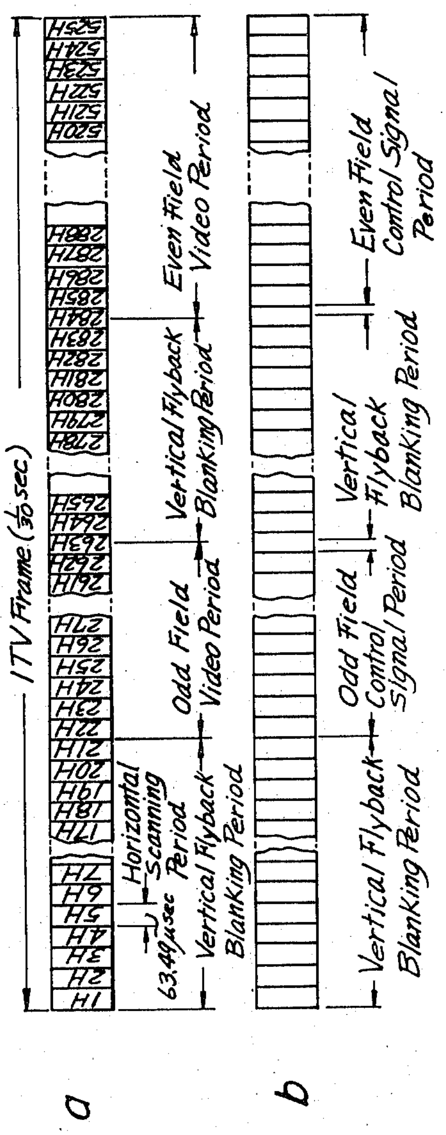
FIG. 2*a* and 2*b* show a signal allocation in one frame of the still picture broadcasting signal.
Figure 3:
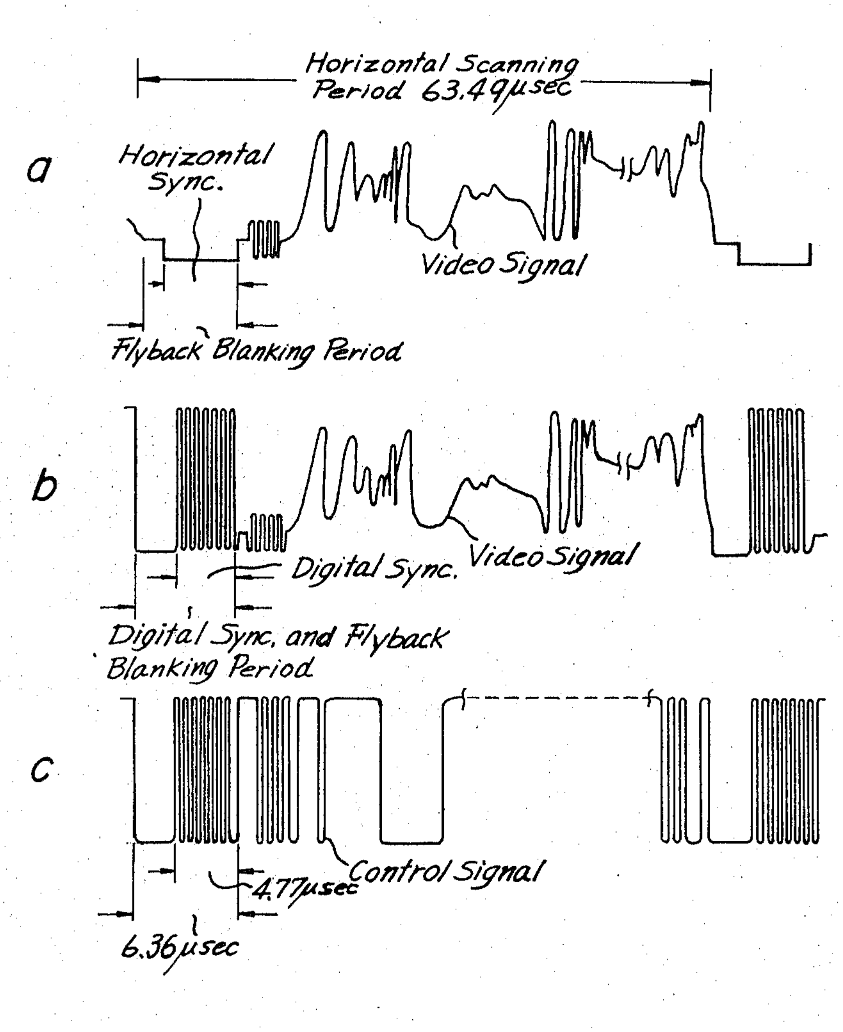
FIGS. 3*a* to 3*c* are waveforms of an example of a known television signal and an example of the still picture broadcasting signal.
Figure 4:
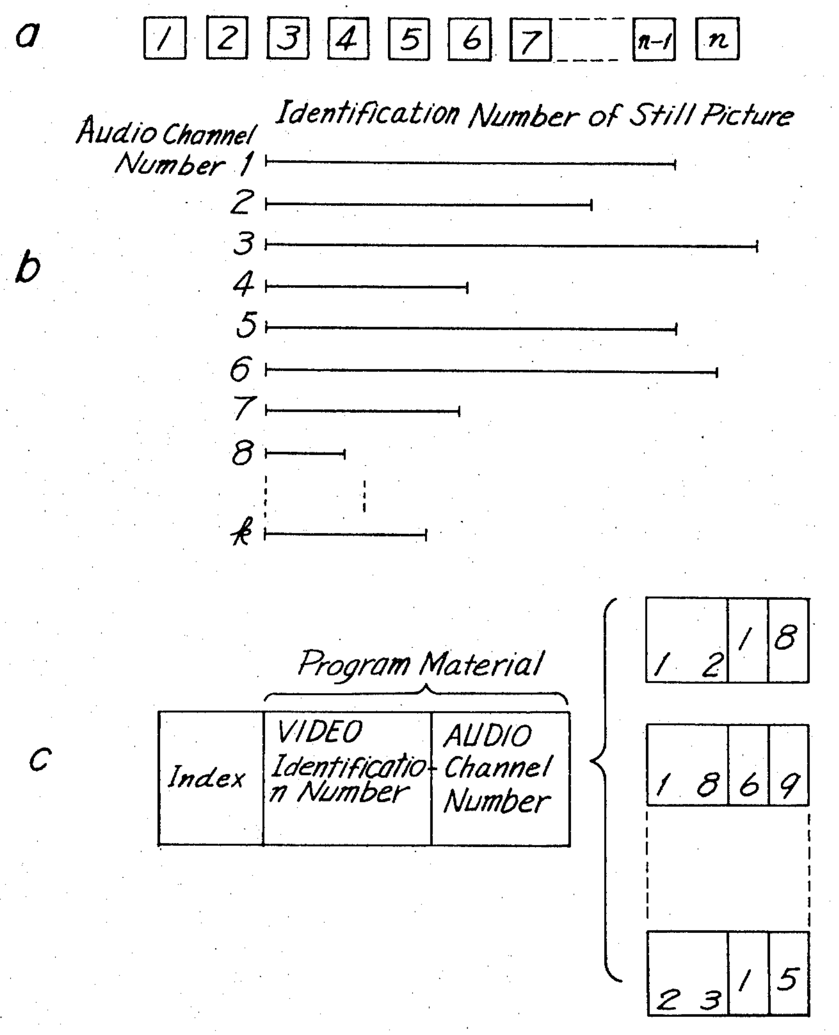
FIGS. 4*a* to 4*c* show the composition of a still picture broadcasting program.

FIG. 1 shows an example of the frame allocation of the still picture broadcasting signal. This signal contains a video signal of the still picture, so that each frame has a duration of one frame period, for example 1/30 seconds in the NTSC system which has been adopted in Japan and United States of America, and the same signal is repeatedly transmitted at a repetition period of 150 frames, i.e., 5 seconds. These 150 frames are divided with a unit period composed of three frames (1/10 seconds), in which a first frame is of a video signal period and second and third frames constitute an audio signal period, and one video signal frame in every one second is used as a control signal period. In FIG. 1 the control signal period is denoted by C, and the signal in this period will be explained in detail hereinafter. The video signal period is shown by V and video signal in each video signal frame V consists one still picture. $S_0$ and $S_1$ denote first and second audio signal periods in which the audio signal is transmitted as a pulse code modulated (PCM) multiplexed signal. Accordingly, in 150 frames for 5 seconds, there are included 5 frames of the control signal period C, 45 frames of the video signal period V, and 100 frames of the audio signal periods $S_0$ and $S_1$.

FIGS. 2*a* and 2*b* show a manner of allocating the various signals to horizontal scanning periods (hereinafter referred to as H period) in the video frame V and the control frame C, respectively. FIG. 2*a* shows the video frame V which is same as that of the NTSC system and consists of 525H periods. FIG. 2*b* shows the control frame C, which differs from the video frame V in a point that in the video frame an odd field video period is allocated from the 22nd horizontal scanning line (hereinafter referred to as 22H) to 262.5H, while in the control frame C the control signal transmission period is somewhat shorter than the video period such as from 22H to 262H. This applies to an even field, too. FIGS. 3*a* to 3*c* are waveforms of the signals inserted in this H period for showing the difference between the conventional television signal and the still picture broadcasting signal. FIG. 3*a* is a waveform of the H period of the conventional television signal, FIG. 3*b* is a waveform of the H period of the video period of the still picture broadcasting signal, and FIG. 3*c* is a waveform of the H period of the control signal period of the still picture broadcasting signal. A particularly different point of the still picture broadcasting signal from the conventional television signal is a waveform of the synchronizing signal, and as shown in FIGS. 3*b* and 3*c*, the synchronizing signal of the still picture broadcasting signal is a digital synchronizing signal consisting of a repeating pattern of pulses 0, 1, 0, 1 . . . ,and such a digital synchronizing signal cannot be amplitude-separated as can be done for the conventional synchronizing signal shown in FIG. 3*a*. The waveform of the video signal other than the synchronizing signal shown in FIG. 3*b* is an analog signal waveform like as that of the conventional television signal, but the control signal shown in FIG. 3*c* is a digital signal consisting of a combination of pulses 0 and 1.

Next the control signal of the above mentioned still picture broadcasting signal will be explained.

FIGS. 4*a* to 4*c* illustrate the composition of the still picture broadcasting program. FIG. 4*a* shows a number of still pictures composing one broadcasting program. When all of the video signal periods shown in FIG. 1 are used for the single program, the program contains 45 still pictures. Each of the *n* still pictures has its own video identification number and each video identification number is composed of a combination of pulses of eight bits and is repeatedly transmitted in a period from 1H to 9H in a vertical flyback period. FIG. 4*b* shows a number of sounds composing one program. In FIG. 4*b* *k* sounds are inserted in *k* audio channels. A time length of each channel can be suitably varied at a transmitter end, but an average time length of a channel is about 10 seconds. The audio signal of *k* channels is in the form of a time division multiplexed quaternary PCM signal and is transmitted in the audio signal periods $S_0$ and $S_1$ shown in FIG. 1.

A still picture broadcasting program is composed of the still pictures shown in FIG. 4*a* and the sounds shown in FIG. 4*b*. In the still picture broadcasting program a program material is composed of a suitable combination of a still picture and a sound. At the transmitter end various program materials have been previously formed by suitably combining the n still pictures and the sounds of *k* channels and at a receiver end a receiver or viewer selects desired program materials in a desired sequence. In this manner the progress of the program is effected. This system is the same as that of the programed instruction.

FIG. 4*c* depicts the composition of the program material. A program material is denoted by a set of a video identification number shown in FIG. 4*a* and an audio channel number shown in FIG. 4*b* which relate to a still picture video signal and an audio signal consisting of the related program material and to the set of the video identification number and the audio channel number is affixed a particular index or label. For example, in an embodiment shown in FIG. 4*c*, a program material consisting of a video identification number 1 and an audio channel number 8 has an index 12. A set of signals denoted by the index is referred as a second control signal which constitutes a part of the control signal.

FIGS. 5*a* and 5*b* illustrate the construction of the control signal. FIG. 5*a* shows the above mentioned second control signal and branches of the second control signals which will be selected by the viewer next to the still picture and sound which are reproduced at the present time. For instance, in FIG. 5*a* the viewer is receiving a program material denoted by an index $A_0B_0$ by a receiver set and at this time the content of the reproduced program material is composed of a still picture having a video identification number 1 and of an audio signal inserted in an audio channel number 8. Next the viewer can select at will any one of seven program materials denoted by indexes $A_1B_1$, $A_1B_2$, $A_1B_3$, $A_1B_4$, $A_1B_5$, $A_1B_6$ and $A_1B_7$, respectively. The construction of such seven program materials any one of which can be selected is referred as the branch of the program material. FIG. 5*b* illustrates the construction of a first control signal for controlling the branch of the program material shown in FIG. 5*a*. In FIG. 5*b* $A_0B_0$ is the index denoting the program material which is reproduced at the present, $A_1$ is an index of a branch A which will substitute for the index $A_0$ and $B_1$, $B_2$, $B_3$, $B_4$, $B_5$, $B_6$ and $B_7$ are indexes of a branches B which will substitute for the index $B_0$. The viewer selects any one of the branches shown in FIG. 5*a* by operating an operation panel. In this case a new index of a desired branch is composed of an index of the branches A and an index of the branch B included in the first control signal shown in FIG. 5*b* and the previous index $A_0B_0$ is replaced by the new index $A_xB_x$. Then the viewer can receive a new program material composed of a still picture having a video identification number *x* and of a sound having an audio channel number *y* on the basis of a new second control signal having the new index $A_xB_x$ instead of $A_0B_0$.

Figure 6:
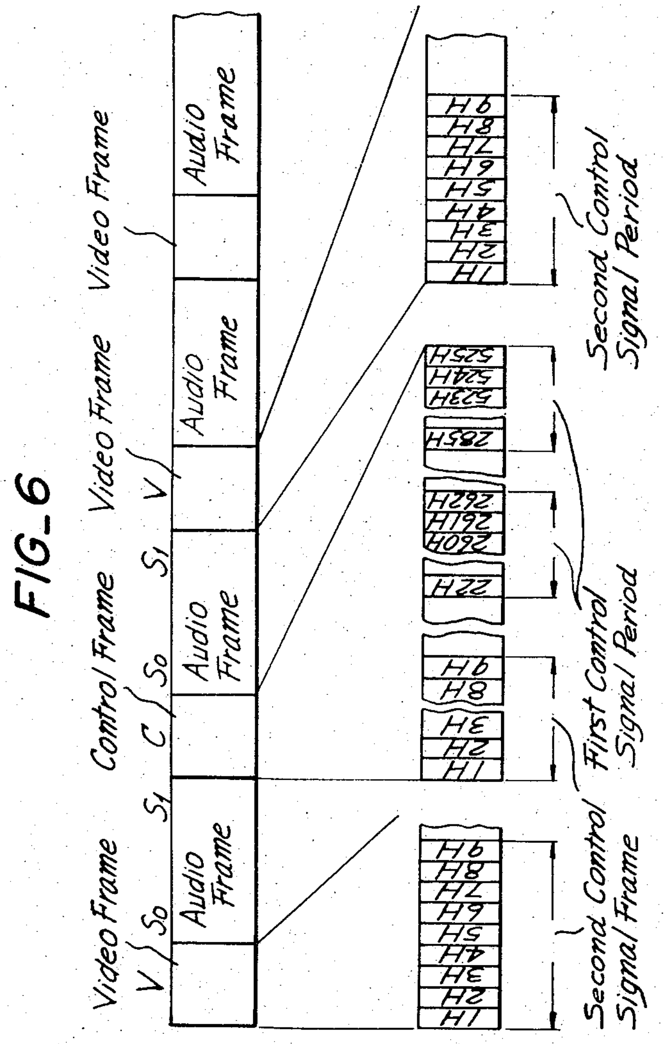
FIG. 6 shows positions at which the control signal is transmitted.

FIG. 6 shows signal periods during which the above mentioned first and second control signals are transmitted. The first control signal is transmitted in the control frame C during time periods from 22H to 262H and from 285H to 526H. The second control signal is transmitted in the video frame V and the control frame C during a time period from 1H to 9H.

Figures 7, 8:
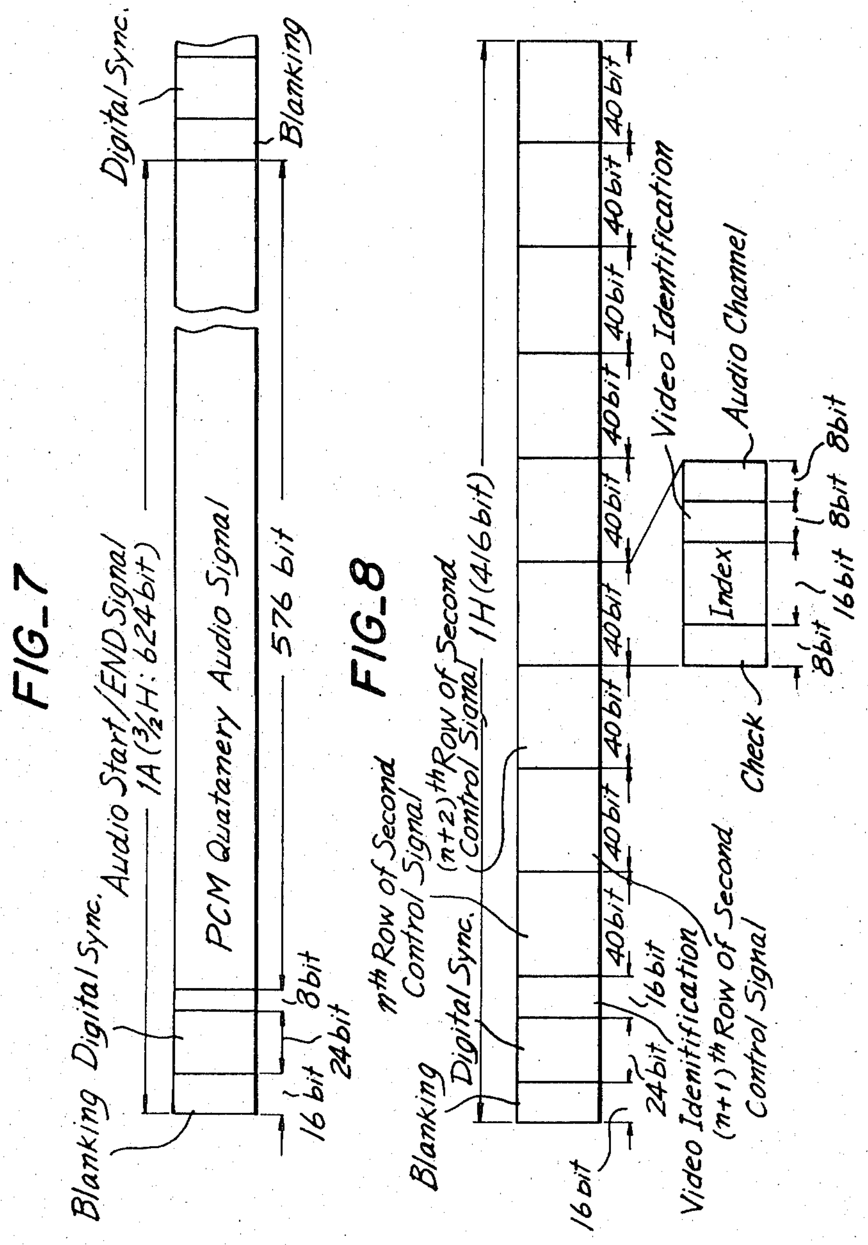
FIG. 7 shows positions at which audio start and end signals are transmitted.
FIG. 8 depicts positions at which the second control signal and video identification signal are transmitted.

The control signal is mainly consisted of the first and second control signals mentioned above, but it further comprises a control signal for controlling starts and ends of the various audio signals. This control signal denotes a start and an end of the audio channel reproduction and is expressed by the audio channel number at which the start and end of the reproduction have to be controlled. FIG. 7 illustrates a position in which the audio start and end control signal is inserted. In FIG. 7 there is shown a signal allocation in a PCM frame period (which corresponds to an audio sampling period and is equal to 1.5H period). The audio start and end control signal expressing the audio channel number is composed of eight bits and is inserted after the digital synchronizing signal, but just before the PCM audio signals. When the audio start and end control signal is inserted in the first audio frame $S_0$ shown in FIG. 1, this signal indicates the start of the reproduction of the audio signal inserted in the related channel and when the control signal is inserted in the second audio frame $S_1$, this signal indicates the end of the reproduction of the audio signal in the related channel.

FIG. 8 shows the allocation of the above described second control signal, the video identification signal denoting the video identification number and the digital synchronizing signal in a 1H period. This 1H period corresponds to any one of 1H periods from 1H to 9H during the video frame V and the control frame C shown in FIG. 6.

The video identification number of each still picture illustrated in FIG. 4*a* is expressed by eight bits and is repeatedly transmitted in the vertical flyback period of the video signal from 1H to 9H. As shown in FIG. 8*a* sixteen bits following to the digital synchronizing signal are allocated to transmit the video identification signal indicating the video identification number. The video identification signal denotes the number of the still picture transmitted in the video frame in which the related video identification signal is inserted. Therefore the video identification signal is not inserted in the control frame C. In fact the video identification signal is composed of eight bits, so that the same video identification signal is inserted twice during the 16 bit period and thus the video identification signal is repeatedly transmitted 18 times during a time period from 1H to 9H.

Following to the video identification signal the second control signal is inserted. A unit or row of the second control signal is composed of 40 bits and denotes a set of program material. During a 1H period nine rows of the second control signals are inserted. As illustrated in FIG. 8*b* each row of the second control signal consisting of 40 bits is constructed by a check signal of eight bits, the index of 16 bits, the video identification number of eight bits and the audio channel number of eight bits. Such rows of the second control signals are included in the video frame and control frame from 1H to 9H and thus 81 rows of the second control signals are totally included in one frame.

The check signal of eight bits is a signal for assuring at the receiver end whether the pulse signal is transmitted correctly or not. That is to say this signal is to avoid malfunction at the receiver end and the control signal is used only when the check signal is detected so as to abandon erroneous control signals affected by noise, etc.

Next the first control signal will be explained in detail. FIG. 9*a* illustrates the allocation of the first control signal in a 1H period. This 1H period is any one of 1H periods from 22H to 262H and from 285H to 525H in the control frame C shown in FIG. 6. A unit or row of the first control signal is constructed by 120 bits and three rows are included in the 1H period. The row of the first control signal is composed of a check signal of eight bits, an index $A_0B_0$ of 16 bits, a next index $A_1$ of eight bits for the branch A and seven next indexes $B_1$, $B_2$, $B_3$, $B_4$, $B_5$, $B_6$ and $B_7$ each consisting of eight bits for the branch B. In each 1H period three rows of the first control signals are inserted and in 482H period of the control frame C 1,446 rows of the first control signals are inserted. As depicted in FIG. 1, five control frames C are provided in 5 seconds and thus the same first control signal is repeatedly transmitted five times in 5 seconds.

Figure 5:
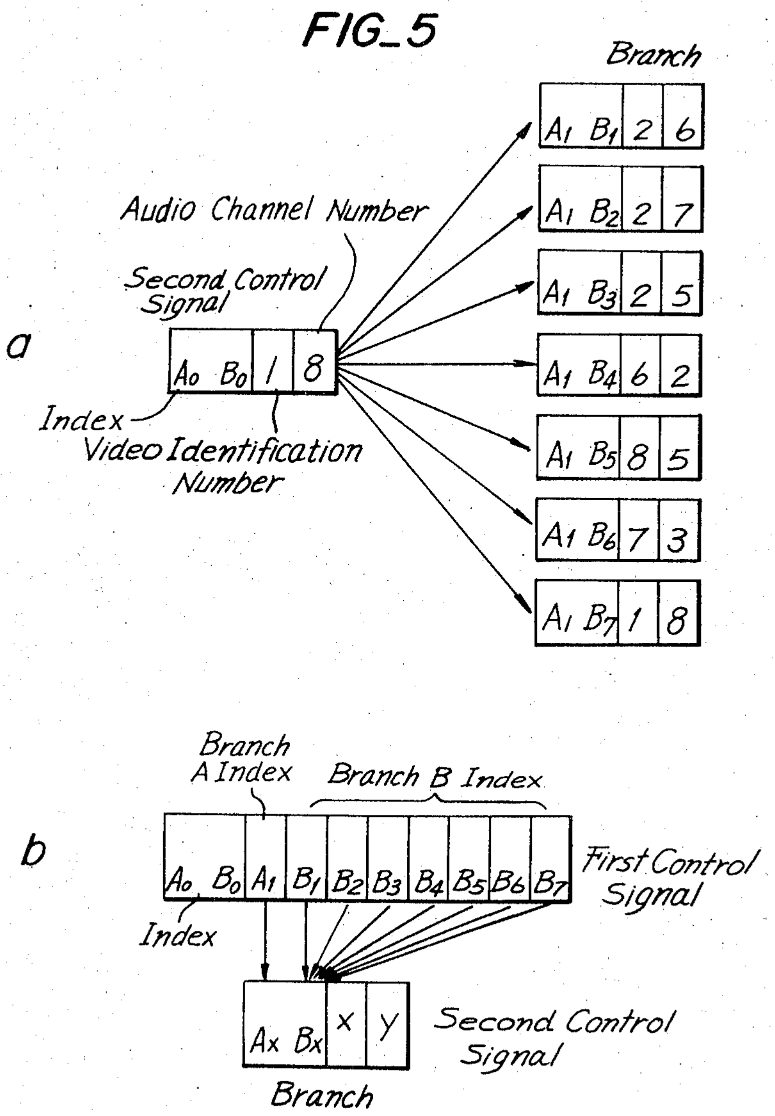
FIGS. 5*a* and 5*b* illustrate the composition of a control signal included in the still picture broadcasting signal.

FIG. 9*c* shows the branch construction in which by means of the first control signal any one of indexes of program materials which can be reproduced next to the program material at the present is determined. As shown in FIG. 5 there are seven program materials any one of which may be displayed next.

Figure 10:
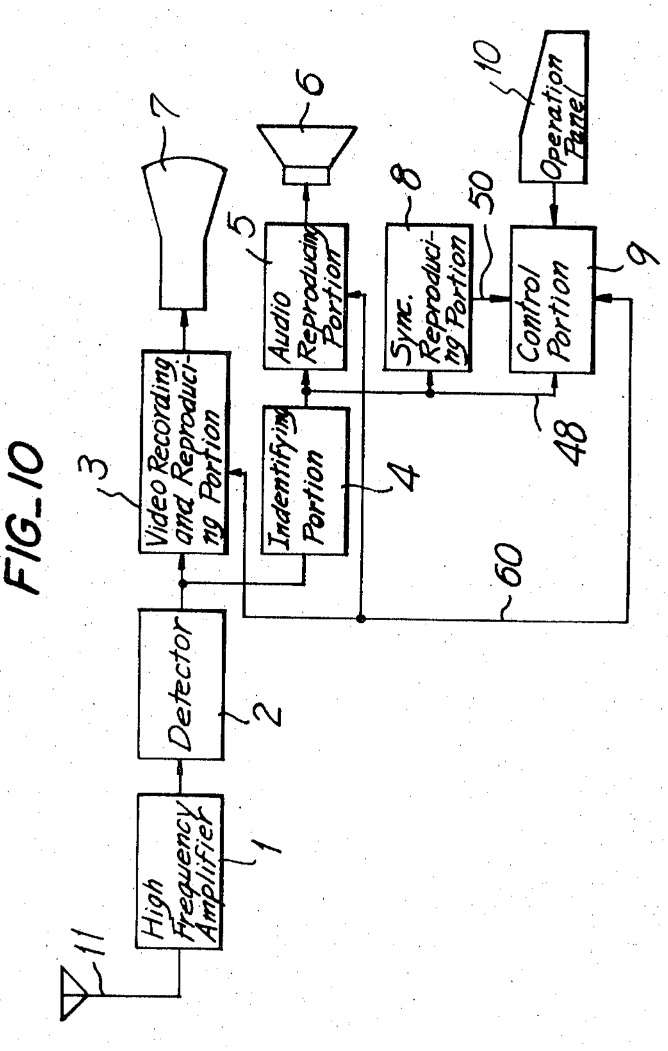
FIG. 10 is a block diagram showing a basic construction of the receiver according to the invention.

The still picture broadcasting signal, mentioned above may be received by a receiver shown in FIG. 10. FIG. 10 is a block diagram showing a general construction of the receiver according to the invention In fact, the still picture broadcasting signal shown in FIG. 1 and FIGS. 3*b*, 3*c* is transmitted with using a suitable carrier. The transmitted signal is received by an antenna 11, treated by a high frequency amplifier 1 in the same manner as a conventional television signal and is demodulated by a detector 2 to recover the original signal. The demodulated signal includes the various kinds of signals described above and a pulse signal other than the video signal is converted into a pulse signal having a correct waveform at a discriminator 4. This pulse signal is supplied to an audio reproducing portion 5, a synchronizing signal reproducing portion 8 and a control portion 9. The present invention mainly relates to the control portion 9. Video and audio signals denoted at the control portion 9 by the receiver with operating an operation panel 10 are identified from the transmitted signal. By means of a command from the control portion 9 the video signal of the still picture to be reproduced is extracted at a video signal recording and reproducing portion 3 and is stored therein. The video signal thus stored is repeatedly reproduced and is displayed by a display device 7. Similarly by means of a command from the control portion 9 at an audio signal reproducing portion 5 the audio channel to be reproduced is extracted from the output signal of the detector 2 and the extracted audio signal is reproduced by a speaker 6.

Figure 11:
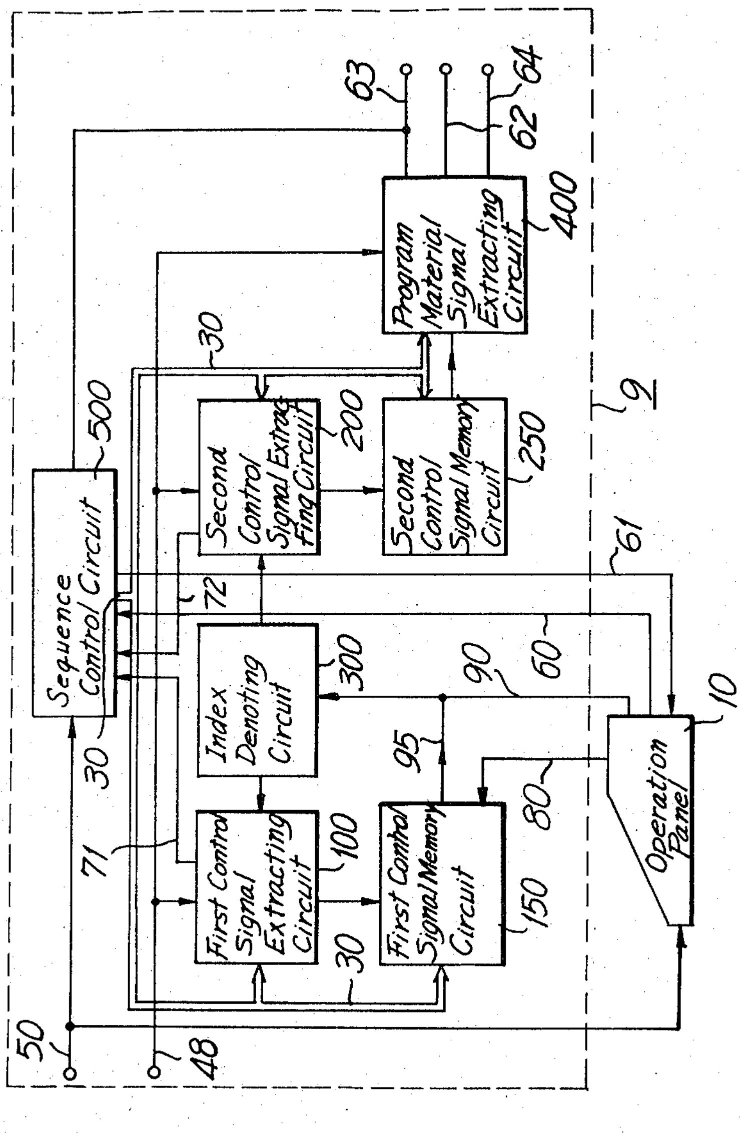
FIG. 11 is a block diagram showing an embodiment of a control signal extracting device according to the present invention.

FIG. 11 is a block diagram illustrating an embodiment of the control portion 9 according to the invention. A reference numeral 100 denotes a first control signal extracting circuit, 150 a first control signal memory circuit, 200 a second control signal extracting circuit, 250 a second control signal memory circuit, 300 an index denoting circuit, 400 a program material signal extracting circuit, 500 a sequence control circuit and 10 illustrates the operation panel. A reference numeral 50 denotes a signal path for receiving the synchronizing signal reproduced at the synchronizing signal reproducing portion 8 shown in FIG. 10 and a reference numeral 48 is a signal path for receiving the pulse signal supplied from the discriminator 4 shown in FIG. 10. These two signal paths constitute an input signal path to the control portion 9. A reference numeral 60 illustrates a signal path for supplying the program material extracting command signal from the operation panel 10 to the sequence control circuit 500. The control portion 9 operates with using the synchronizing signal formed by the synchronizing signal reproducing portion 8 as a reference signal.

Now function of each circuit mentioned above will be explained.

Figure 9:
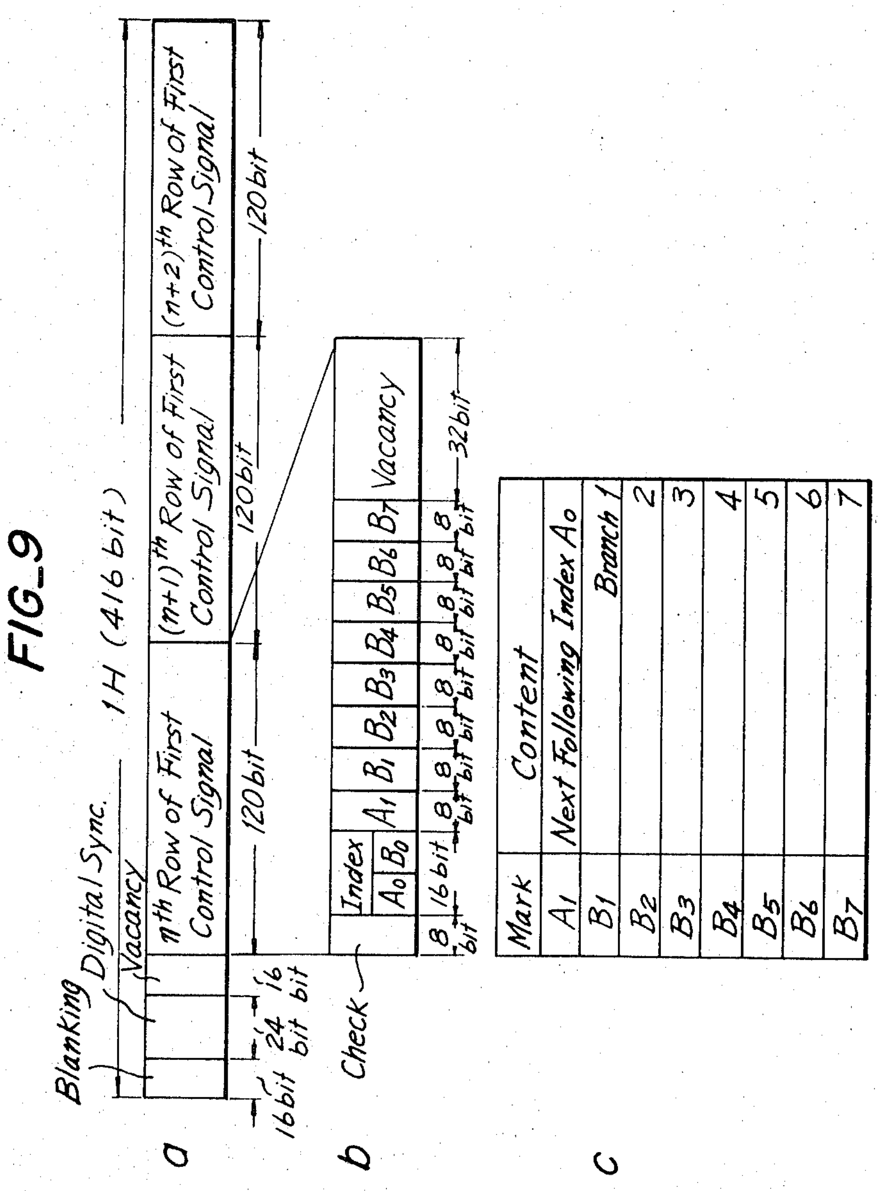
FIGS. 9*a* and 9*b* illustrate positions at which the first control signal is transmitted and FIG. 9*c* shows the composition of the first control signal.

The first control signal extracting circuit 100 is to extract a row of the first control signal composed of 120 bits and inserted in the control frame as shown in FIGS. 9*a* and 9*b*. In this case a mark for extraction, i.e., information for indicating which row of the first control signal is extracted, is denoted by the index denoting circuit 300. The first control signal memory circuit 150 is to store the indexes $A_1$ to $B_7$ in the first control signal extracted by the extracting circuit 100. As shown in FIG. 9 each of the indexes $A_1$ to $B_7$ consists of eight bits, and thus the memory circuit 150 has a storage capacity of 64 bits. The second control signal extracting circuit 200 is to extract a row of the second control signal from a number of rows of the second control signals each composed of 40 bits as shown in FIG. 8*a*, which row of the second control signal has the same index as that denoted by the index denoting circuit 300 in the same manner as the first control signal extracting circuit 100. The second control signal memory circuit 250 is to store a 16 bit signal consisting of the video identification signal of eight bits and the audio channel number signal of eight bits included in the second control signal illustrated in FIG. 8*b*. The index denoting circuit 300 is to indicate the index of the first and second control signals to be extracted by means of the operation of the operation panel 10. The program material signal extracting circuit 400 uses the video identification signal or number and audio channel signal or number forming the program material indentification signal as a reference signal for collation and produces an extraction command signal for extracting a still picture and sound having the same identification numbers represented by said numbers from the transmitted still picture broadcasting signal. The sequence control circuit 500 is to scan the first control signal extracting circuit 100, the memory circuit 150, the second control signal extracting circuit 200, the memory circuit 250 and the program material signal extracting circuit 400 so as to operate these circuits independently from each other only during transmission periods of the first control signal, the second control signal and the program material identification signal, respectively. This scanning operation is carried out by selectively supplying clock pulses to these circuits.

Figure 12:
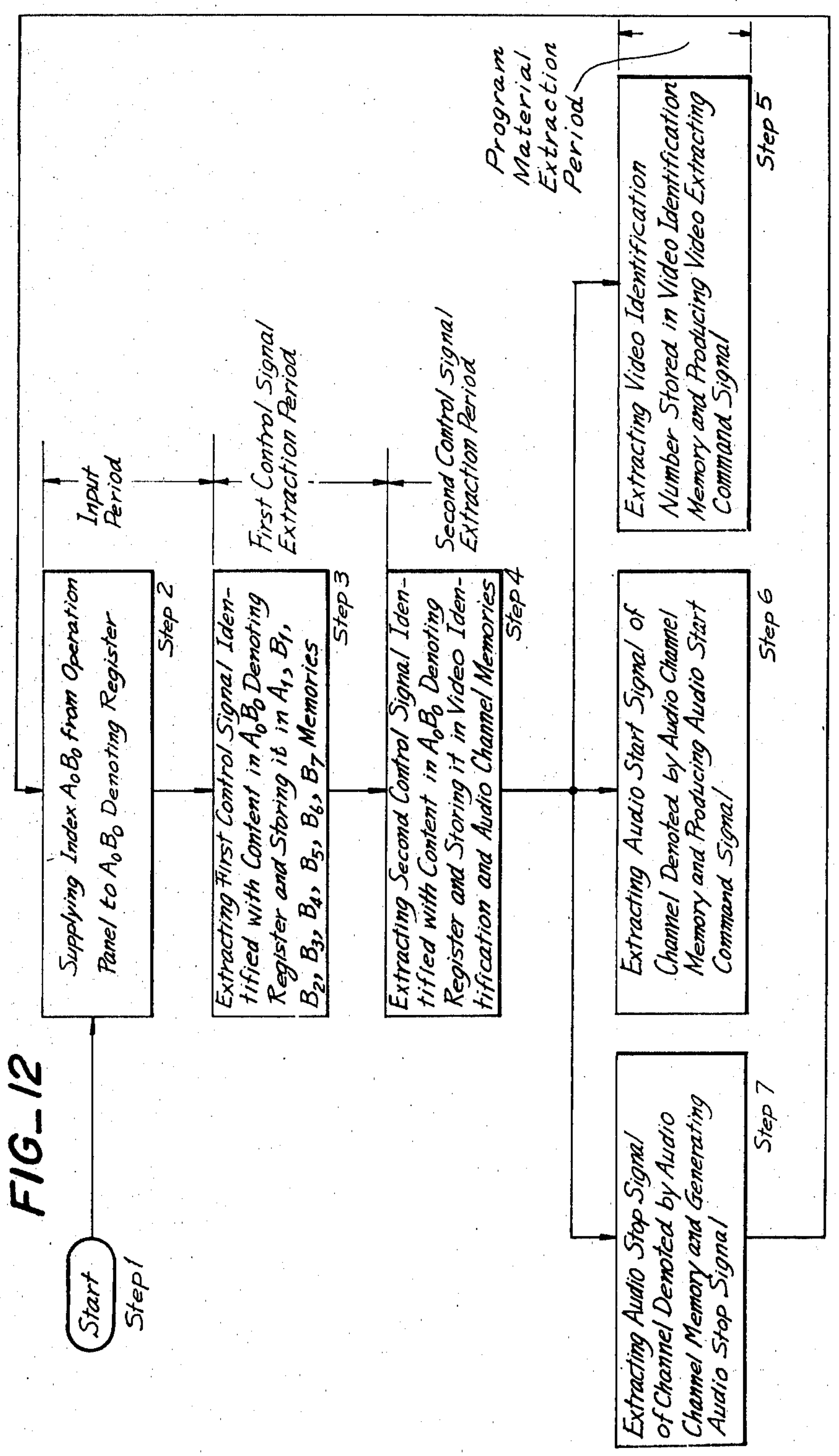
FIG. 12 is a flow chart showing successive steps of operations of the device shown in FIG. 11.

FIG. 12 is a flow chart showing the above mentioned controls at the control device 9. Steps 1 and 2 in FIG. 12 are steps for denoting the indexes by the receiver from the operation panel 10 to the index denoting circuit 300. This period is an input period and during this input period the receiver comprehends the still picture and sound which are displayed at the present and provides a next index of a program material which should follow the present program material by means of the operation panel. The step 3 is a step for selecting the first control signal having the index denoted by the index denoting circuit 300 from the still picture broadcasting signals by the first control signal extracting circuit 100 and storing it in the memory circuit 150. The next step 4 is a step for extracting the second control signal from the still picture broadcasting signals by the second control signal extracting circuit 200 and storing it in the memory circuit 250. Accordingly, a period of the step 3 and the step 4 is for extracting the first and second control signals. The steps 5, 6 and 7 are steps for producing at the program material signal extracting circuit 400 a command signal for extracting video and audio signals having the video identification and audio channel numbers, respectively stored in the memory circuit 250 and thus the period of steps 5, 6 and 7 is for extracting the program material.

Figure 13:
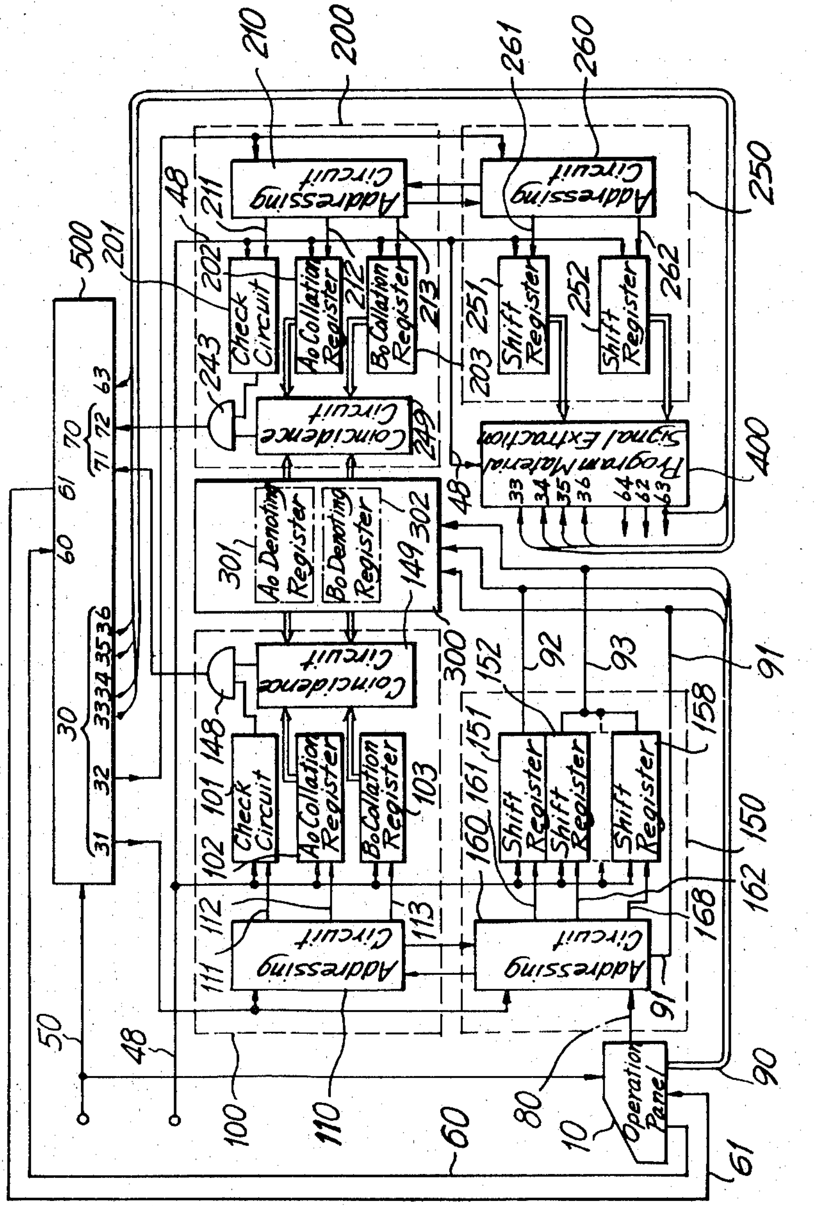
FIG. 13 is a block diagram showing in detail the device illustrated in FIG. 11.
Figure 14:
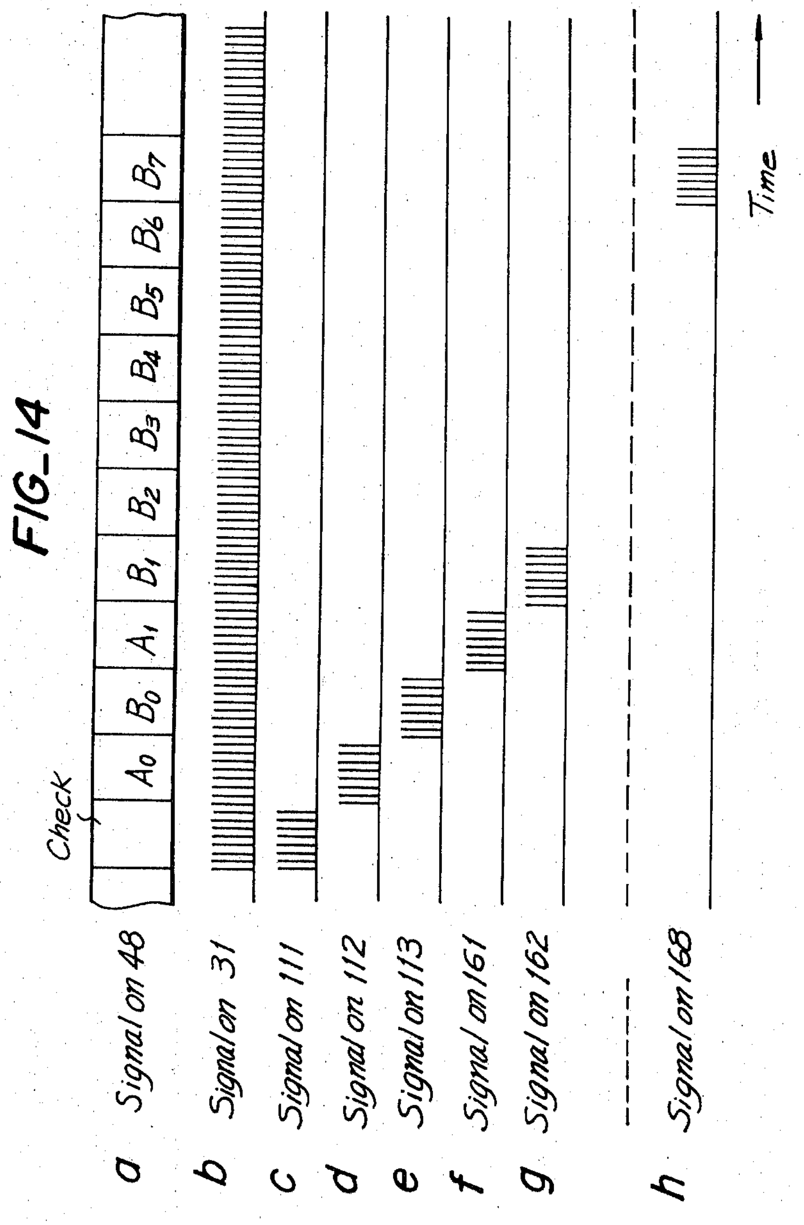
FIGS. 14*a* to 14*h* are signal waveforms for explaining the operation of a first control signal extracting circuit.

Next, each circuit of the control portion 9 illustrated in FIG. 11 is explained in detail. FIG. 13 is a detailed block diagram of the circuit shown in FIG. 11. Here, the operations of the first control signal extracting circuit 100 and the first control signal memory circuit 150 are described. In FIG. 13, 101 is a check circuit for preventing an error of the signal, 102 is a collation register for collating the index $A_0$ of the first control signal, and 103 is a collation register for collating the index $B_0$ of the same, and both of them consist of a shift register of eight bits. 149 is a coincidence circuit for judging whether or not a content in the form of a combination of 0, 1 stored in the collation registers 102 and 103 is equal to a content stored in $A_0$ and $B_0$ denoting registers 301, 302 of the index denoting circuit 300, and when they are coincided with each other, a coincidence output pulse is generated. Circuits 151 to 158 are for storing the first control signal, each of which is a shift register of eight bits. 110 and 160 are addressing circuits for distributing eight clock pulses to each of the collation registers 102, 103 and the shift registers 151 to 158 of the memory circuit 150. FIG. 14 is a waveform showing the operations of the first control signal extracting circuit 100 and the memory circuit 150 shown in FIG. 13. FIG. 14*a* shows an input signal supplied to the check circuit 101, the collation registers 102 and 103 and the shift registers 151 to 158 of the memory circuit 150 through the signal path 48. In the same manner, FIG. 14b illustrates input clock pulses to the addressing circuits 110 and 160 shown in FIG. 13. When the first control signal shown in FIG. 14*a* arrives at the signal path 48 shown in FIG. 13, the sequence control circuit 500 generates the signal shown in FIG. 14*b* at an output terminal 31. When the addressing circuits 110 and 160 receive said signal, it supplies clock pulses of eight bits shown in FIGS. 14*c*, 14*d*, 14*e*, 14*f*, 14*g* and 14*h* to the check circuit 101, the collation registers 102, 103, and the shift registers 151 to 158 of the memory circuit 150, respectively. For instance, the shift register of the collation register 103 receives the clock pulses of 8 bits shown in FIG. 14*e* and it means that the index $B_0$ composed of eight bits among the input signals appearing on the signal path 48 is selectively supplied to the $B_0$ collation register 103. In this manner, the check signal shown in FIG. 14*a* is stored in the check circuit 101 shown in FIG. 13, the index $A_0$ is stored in the $A_0$ collation register 102, and so on and finally the index $B_7$ is stored in the shift register 158.

When completed the above operation, it is judged by the coincidence circuit 149 shown in FIG. 13 that the contents of the collation registers 102 and 103, i.e., the indexes $A_0$ and $B_0$ are equal to those denoted by the index denoting circuit 300. In this case, if they are coincided with each other, a coincidence pulse is produced from the logic product circuit 148 as an output signal. The check circuit 101 judges whether the signal of the relevant row is correctly stored, and if correct, it supplies an output to the logic product circuit 148. When said coincidence pulse and the check pulse signal are existent simultaneously, the logic product circuit 148, applies an output signal to an input terminal 71 of the sequence control circuit 500 in order to stop the supply of the clock pulses to the first control signal extracting circuit 100 and the memory circuit 150. That is to say the sequence control circuit 500 stops generation of the clock pulse from the output terminal 31 by means of the signal applied to this input terminal 71. Accordingly, the supply of clock pulses to the shift registers 151 to 158 is stopped, and thus informations of $A_1B_1B_2 \ldots B_7$ have been stored in each of the shift registers 151 to 158. On the contrary, if coincidence cannot be obtained, the sequence control circuit 500 continues to generate the clock pulses shown in FIG. 14*b* from the output terminal 31 until the coincidence is obtained. Up to this step, the detailed operation of the step 3 shown in FIG. 12 has been explained.

Next, the operation of the second control signal extracting circuit 200 and the second control signal memory circuit 250 shown in FIG. 13 is explained. These circuits have the same operational principle as that of the abovementioned first control signal. Accordingly, a check circuit 201 of the second control signal extracting circuit 200 corresponds to the check circuit 101 of the first control signal extracting circuit 100. In the same manner, an addressing circuit 210 corresponds to the addressing circuit 110, collation registers 202, 203 to the registers 102, 103, a coincidence circuit 249 to the coincidence circuit 149, a logic product circuit 248 to the circuit 148, and an addressing circuit 260 corresponds to the circuit 160, respectively. Further, collation registers 251 and 252 correspond to the shift registers 151 and 152, but as shown in FIG. 8*b*, the second control signal comprises the video identification signal and the audio channel signal each composed of eight bits, so that it is enough to provide two of these shift registers in the second control signal memory circuit 250. Further, when the operation of the second control signal extracting circuit 200 and the memory circuit 250 are considered, the waveform shown in FIG. 14*a* should be replaced by the second control signal shown in FIG. 8*a*, and the signal in FIG. 14*b* becomes the signal at the output terminal 32. Up to this step, the detailed operation of the step 4 shown in FIG. 12 has been explained.

Figure 15:
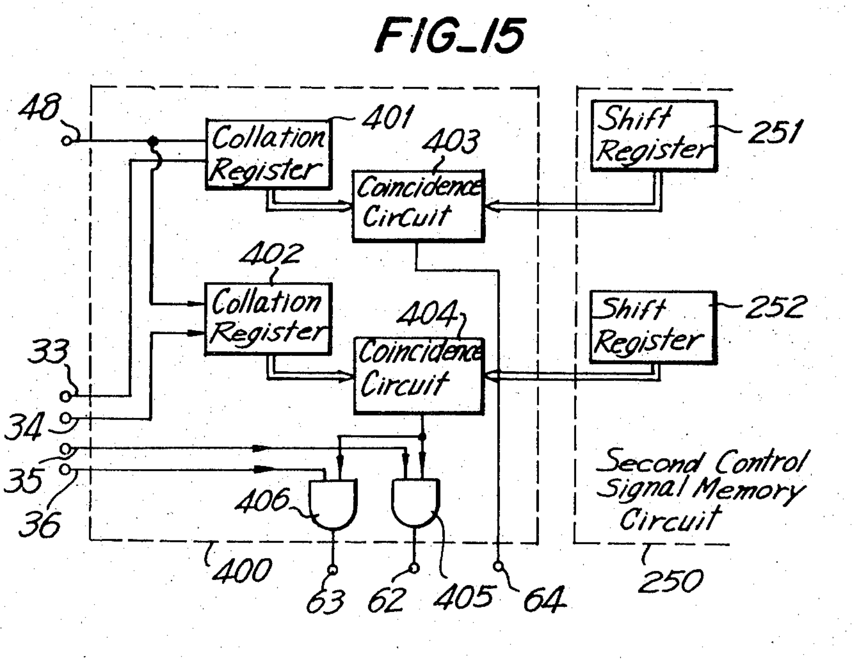
FIG. 15 is a detailed block diagram of a program material signal extracting circuit.
Figure 16:
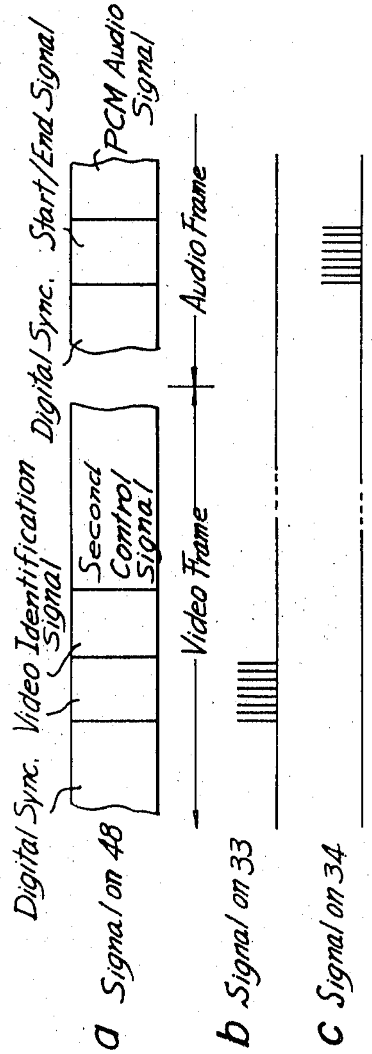
FIGS. 16*a* to 16*c* are signal waveforms for explaining the operation of the circuit shown in FIG. 15.

FIG. 15 is a detailed block diagram of the program material signal extracting circuit 400, and FIG. 16 is a signal waveform for explaining the operation thereof. In FIG. 15, 401 is a collation register of the video identification signal, 402 is a collation register of the audio channel signal, and both of them consist of shift registers. 403 and 404 are coincidence circuits, and 405 and 406 are logic product circuits. The operation of the above program material signal extracting circuit 400 is explained hereinafter. When the input signal shown in FIG. 16*a* arrives at the collation register 401 shown in FIG. 15, only during the time period of the video identification signal, the clock pulses of eight bits of the waveform shown in FIG. 16*b* are supplied into the collation register 401 through a clock pulse signal path 33 from the sequence control circuit 500 shown in FIG. 13. Accordingly, this collation register 401 stores the video identification signal. Whether or not the thus stored video identification number coincides with the video identification number previously stored in the register 251 of the memory circuit 250 is judged by the coincidence circuit 403. If they are identified with each other, the coincidence output signal, i.e., the video extracting command signal is appeared at a terminal 64.

Another collation register 402 stores the audio start and stop signals existent in the audio signal period by means of the clock pulses shown in FIG. 16*c* in the same manner as the collation register 401, and judges whether or not it coincides with the content stored in the memory register 525 of the memory circuit 250 by means of the coincidence circuit 404. In case of obtaining coincidence by the coincidence circuit 404, to both the logic product circuits 405, 406 are applied the coincidence pulses. Further, at the same time, to the other input terminal 35 of the logic product circuit 405 is applied a signal indicating the $S_0$ period of the audio signal and to the other input terminal 36 of the logic product circuit 406 is applied a signal for denoting the $S_1$ period of the audio signal. Accordingly, if the signals coincidence of which is detected by the coincidence circuit 404 are the start signals, the coincidence pulse is generated at the terminal 62 because the start signal is inserted in the $A_0$ period, and if it is the stop signal, the coincidence pulse is appeared at the terminal 63. The output appeared at the output terminal 64 of the coincidence circuit 403 in the program material signal extracting circuit 400 is an output of the step 5 shown in FIG. 14, the output appeared at the output terminal 62 of the logic product circuit 406 is an output of the step 6, and the output appeared at the output terminal 63 of the logic product circuit 405 is an output of the step 7.

Figure 17:
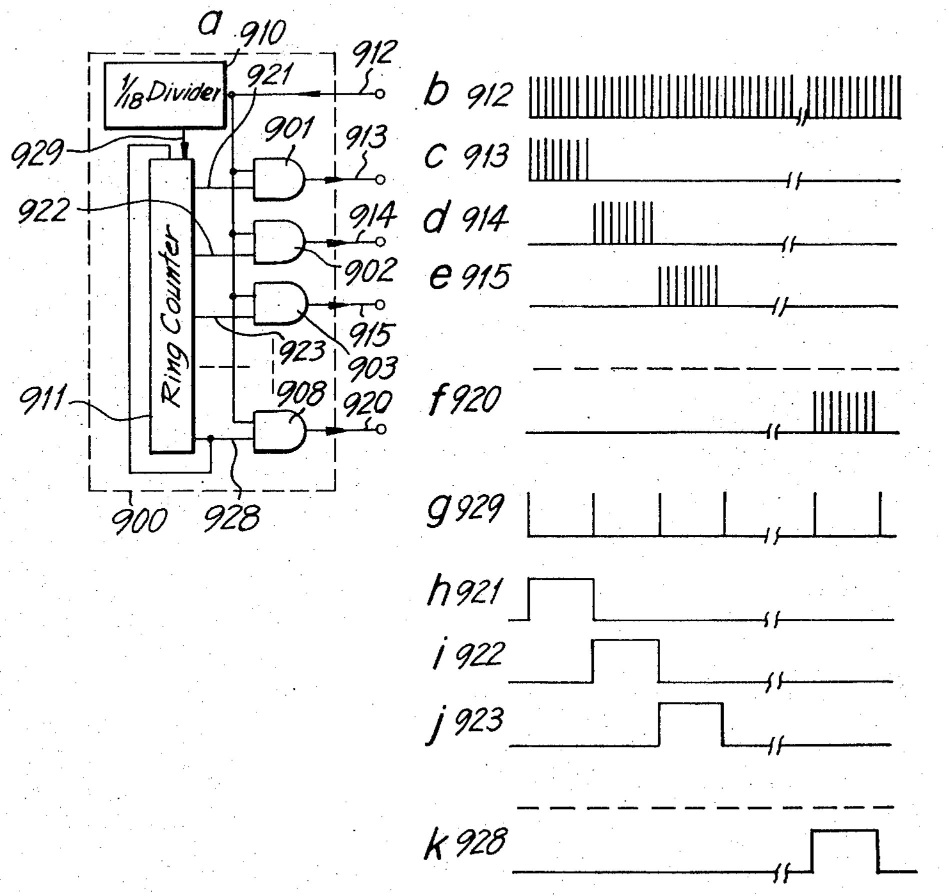

FIG. 17*a* is a detailed block diagram showing an embodiment of the addressing circuit, and FIGS. 17*b* to 17*k* are waveforms for explaining the operation thereof. The addressing circuit 900 shown in FIG. 17*a* may be commonly used as the addressing circuit 110, 160, 210 and 260 shown in FIG. 13. 911 is a ring counter, 910 is a ⅛ frequency dividing circuit, and 901 to 908 are logic product circuits. To the input of the addressing circuit 900 is applied the clock pulses 912 shown in FIG. 17*b* and the clock pulses are supplied to the ⅛ frequency dividing circuit 910 and the logic product circuits 901 to 908. The ⅛ frequency dividing circuit 910 divides the input pulses shown in FIG. 17*b* by eight so as to produce output pulses 929 shown in FIG. 17*g*. The ring counter 911 receives this signal 929 as an input signal and produces a pulse shown in FIG. 17*h* from the output terminal at the first stage of the ring counter 911, a pulse shown in FIG. 17*i* from the output terminal at the second stage thereof and so on. In this manner pulses shown in FIGS. 17*h* to 17*k* of a time width of 8 bits are obtained from the output terminals of each stage as each output signal of the ring counter 911 successively. The logic product of the signal shown in FIG. 17*h* and of the signal shown in FIG. 17*b* is formed in the logic product circuit 901 and the pulses 913 of eight bits shown in FIG. 17*c* are generated at the output terminal. The signals shown in FIGS. 17*i* and 17*b* . . . 17*j* and 17*b* are successively applied to the logic product circuits 902 . . . 908 and the output signals 914 to 920 shown in FIGS. 17*d* to 17*f* are obtained at the outputs of these logic product circuits.

Figure 18:
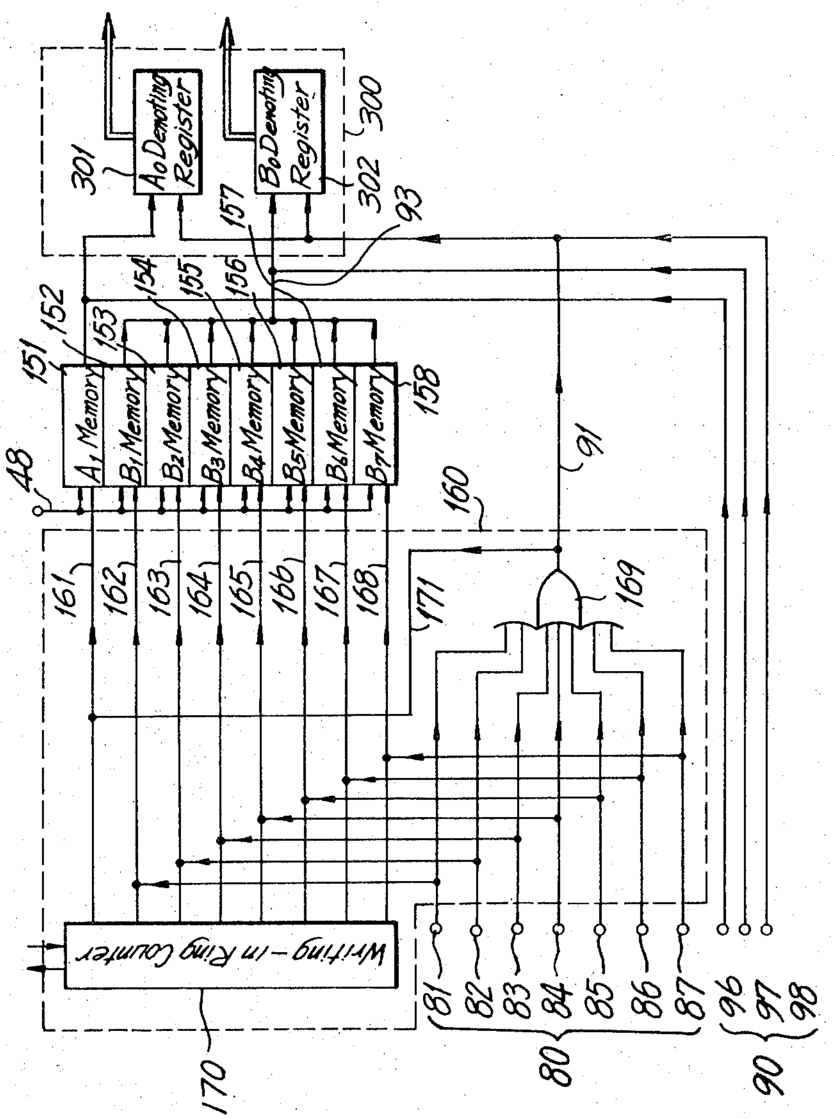
FIG. 18 is a detailed block diagram of a circuit for applying an index to an index denoting circuit.

FIG. 18 is a detailed circuit diagram of a circuit for applying information about the index to be extracted to $A_0$ and $B_0$ denoting registers 301, 302 of the index denoting circuit 300 which denotes the index for extracting the control signal. There are two cases for applying the indexes to the index denoting circuit 300. In the first case, the index to be extracted is put into the index denoting circuit 300 from the operation panel 10 through a signal path 90 in the circuit shown in FIG. 13. In this first case the contents of index $A_0B_0$ are directly supplied to the index denoting registers 301 and 302 from the operation panel 10. In this case, the content of the index $A_0$ of eight bits is directly supplied from the operation panel 10 to a signal path 96 and the content of the index $B_0$ of eight bits is directly supplied from the operation panel 10 to a signal path 97, respectively. At the same time to clock pulse input terminals of the registers 301 and 302 are supplied clock pulses of eight bits from the operation panel 10 through a signal path 98 in synchronized with the transmission of the indexes $A_0$ and $B_0$ from the signal paths 96 and 97 and thus indexes $A_0$ and $B_0$ are stored in the registers 301 and 302, respectively.

In the second case, the receiver selects a suitable index from the indexes stored in the shift registers 151 to 158 and the contents of the selected index are supplied to the registers 301 and 302. The selection of the index is effected by selecting seven signal paths 81 to 87 shown in FIG. 18. If the signal path 81 is selected, clock pulses of eight bits are applied to the signal path 81. The clock pulses are supplied through a signal path 162 to the $B_1$ memory shift register 152 as clock pulses. By means of the clock pulses, information about the index $B_1$ stored in the shift register 152 is transferred to the $B_0$ denoting register 302 through a signal path 93. The pulses of eight bits applied to the signal path 81 also pass through a logic sum circuit 169 and are further applied to two signal paths 91 and 171. The clock pulses of eight bits appearing on the signal path 171 are supplied to the $A_0$ memory shift register 151 and the content of the index $A_1$ stored in the shift register 151 is transferred to the $A_0$ denoting register 301. The clock pulses of eight bits appearing on the signal path 91 serve as clock pulses for writing the information about the indexes $A_1$ and $B_1$ into the registers 301 and 302, respectively. As explained above, the clock pulses of eight bits applied to the signal path 81 are simultaneously supplied to the registers 151, 152, 301 and 302 through the signal paths 162, 171, 161 and 91, respectively. Therefore the contents stored in the shift registers 151 and 152 are transferred to the $A_0$ and $B_0$ denoting shift registers 301 and 302 through the signal paths 92 and 93, respectively.

When the signal path 82 is selected by the receiver, the content of the index $B_2$ stored in the $B_2$ memory shift register 153 is transferred to the $B_0$ denoting shift register 302 and when the signal path 83 is selected, the content of the index $B_3$ stored in the $B_3$ memory shift register 154 is transferred to the $B_0$ denoting shift register 302. In this manner anyone of the signal paths 81 to 87 may be selected. When anyone of the signal paths 81 to 87 is selected, the clock pulses alway pass through the logic sum circuit 169 and thus the content of the index $A_1$ stored in the $A_1$ memory shift register 151 is transferred to the $A_0$ denoting circuit 301. As mentioned above the receiver applies the clock pulses of eight bits to anyone of the signal paths 81 to 87 shown in FIG. 18 by operating a button provided on the operation panel 10. By selecting anyone of the seven signal paths the content of anyone of the indexes $B_1$ to $B_7$ stored in anyone of the shift registers 152 to 158 is transferred to the $B_0$ denoting register 302 and at the same the content of the index $A_1$ stored in the shift register 151 is transferred to the $A_0$ denoting register 301.

The above mentioned circuits are operated by the sequence control circuit 500 in accordance with the steps illustrated in FIG. 12 and the still picture broadcasting signal which constitutes a program and is repeatedly transmitted at a period of 5 seconds can be received to effect programed instruction.

As explained above, when a still picture and a sound are reproduced, there are seven kinds of combinations of still pictures and sounds which may be selected next by the receiver, so that different receivers may selects different combinations. Accordingly, if programed instruction is effected between a single transmitter and a number of receivers which receive the same still picture broadcasting signal, each student can work at his own rate of learning.

Next another embodiment of the present invention will be explained.

Figure 19:
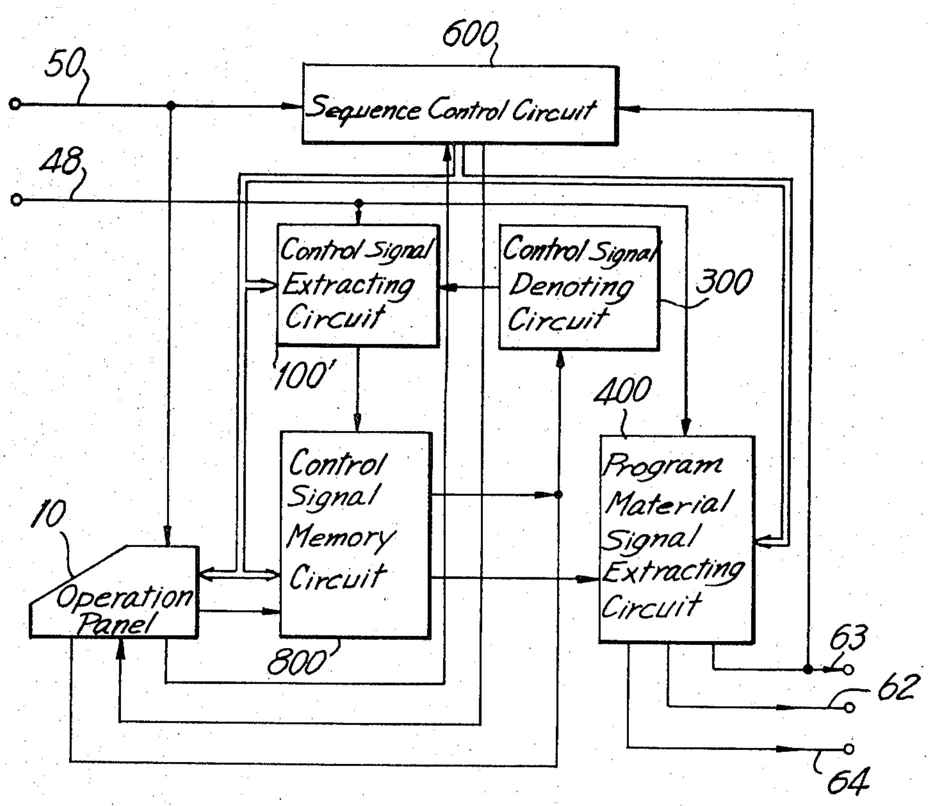
FIG. 19 is a block diagram showing another embodiment of the receiver according to the present invention.
Figure 20:
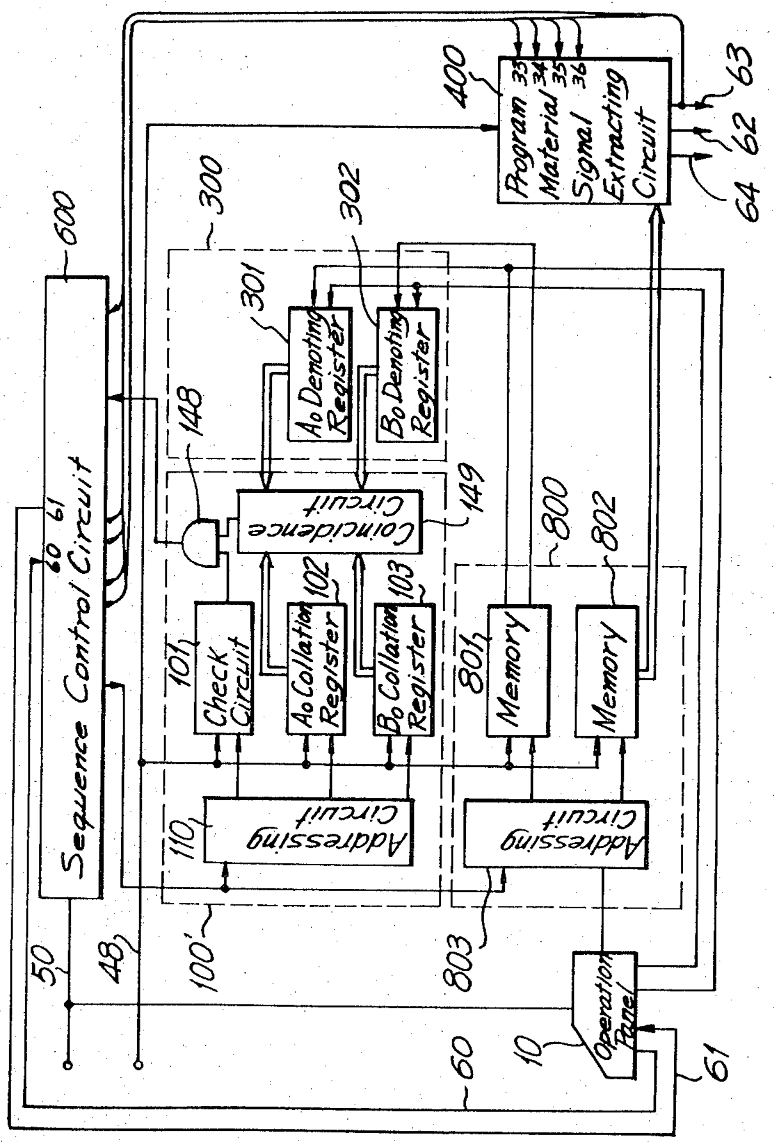
FIG. 20 is a detailed block diagram of the receiver shown in FIG. 19.

FIG. 19 is a block diagram showing another embodiment of the receiver according to the invention and FIG. 20 is a detailed block diagram thereof. The present embodiment differs from the previously described embodiment in a point that in the present embodiment a common extracting circuit is used as the first and second control signal extracting circuits so as to save one of the control signal extracting circuits. Accordingly one of common portions of the two memory circuits may be omitted and these circuits are constructed by a single memory circuit having a large storage capacity capable of storing the first and second control signals. Therefore the construction of the present embodiment is much simpler than the first embodiment.

The operation of the receiver of the present embodiment is substantially same as that of the previously explained embodiment. A control signal extracting circuit 100' firstly extracts the first control signal having the same index as that denoted by the $A_0$ denoting register 301 and the $B_0$ denoting register 302 and stores the thus extracted first control signal in a memory 801 of a control signal memory circuit 800. Next the control signal extracting circuit 100' extracts the second control signal with leaving the index of the index denoting circuit 300 unchanged and stores the thus extracted second control signal in a memory 802 of the control signal memory circuit 800. On the basis of the video identification signal and the audio channel signal stored in the memory 802 a program material signal extracting circuit 400 produces a command signal for extracting the desired still picture and sound identified by said identifying signals. The present receiver operates in the same manner as the receiver shown in FIG. 11 with following the successive steps illustrated in FIG. 12 and receives the still picture broadcasting signal to carry out programed instruction.

As described above, according to the present invention the signal including a plurality of still pictures and sounds transmitted through the single transmission path is received and the receiver or student can reproduce desired still pictures and sounds in a desired sequence. More over when at the transmitter end a program has been previously composed by combining a plurality of still pictures and sounds, the receiver or student can effect programed instruction by operating the operation panel. Further the receiver or student can start programed instruction at any time as long as the transmitter transmits the still picture broadcasting signal.

What is claimed is:

1. A receiver for receiving a composite signal comprising a video signal representing a plurality of still pictures, an audio signal representing a plurality of sounds and inserted in a plurality of channels in the form of a pulse code modulated and time division multiplexed signal, a control signal including a program material identification signal consisting of a video identification number for identifying each video signal of each still picture and an audio channel number for identifying each audio signal inserted in each channel, a second control signal consisting of a number of rows each comprising an index for identifying each of a number of program materials composed of combinations of still pictures and sounds and the program material identification signal for identifying the program material denoted by said index and a first control signal consisting of a number of rows each comprising an index similar to said index of said second control signal and a plurality of indexes identifying a plurality of program materials for selecting given program materials from a number of program materials and for controlling progress of reproduction of the program materials in accordance with a predetermined rule, and a synchronizing signal necessary for reproducing at a receiver end said video, audio and control signals, all of the above mentioned signals being arranged in a predetermined sequence at a period of a predetermined time interval, comprises an operation panel operated for selecting said video and audio signals;

index denoting means for denoting an index by means of operation of said operation panel;

means for extracting from the composite signal each one row of said first and second control signals having the same index as that denoted by said index denoting means;

storage means for storing said first and second control signals extracted by said extracting means;

signal producing means for producing a signal for extracting from the composite signal the video and audio signals having the video identification number and the audio channel number, respectively denoted by the second control signal stored in said storage means;

means for reproducing the video and audio signals extracted by means of said signal generated by said signal producing means; and means for selecting one of the indexes included in said first control signal stored in said storage means by means of a command from said operation panel operated in accordance with information of said reproduced still picture and sound and for supplying the selected index to said index denoting means to renew the index denoted by said index denoting means.

2. A receiver as claimed in claim 1, wherein each of said index denoting means, said means for extracting said first and second control signals, said storage means for storing said control signal and said means for producing said signal for extracting the video and audio signals denoted by said second control signal comprises a shift register and said receiver further comprises sequence control means for selectively supplying clock pulses to each of said shift registers in a predetermined sequence to operate all of said means in a predetermined sequence.

3. A receiver as claimed in claim 1, wherein said receiver further comprises sequence control means for denoting the extraction sequence of said first and second control signals; and means for operating said control signal extracting means under the control of said sequence control means in such a manner that said first control signal is first extracted and stored in said storage means and then said second control signal is extracted and stored in said storage means.

4. A receiver for receiving a composite signal comprising a video signal representing a plurality of still pictures, an audio signal representing a plurality of sounds and inserted in a plurality of channels in the form of a pulse code modulated and time division multiplexed signal, a control signal including a program material identification signal consisting of a video identification number for identifying each video signal of each still picture and an audio channel number for identifying each audio signal inserted in each channel, a second control signal consisting of a number of rows each comprising an index for identifying each of a number of program materials composed of combinations of still pictures and sounds and the program material identification signal for identifying the program material denoted by said index and a first control signal consisting of a number of rows each comprising an index similar to said index of said second control signal and a plurality of indexes identifying a plurality of program materials for selecting given program materials from a number of program materials and for controlling progress of reproduction of the program materials in accordance with a predetermined rule and a synchronizing signal necessary for reproducing at a receiver end said video, audio and control signals, all of the above mentioned signals being arranged in a predetermined sequence at a period of a predetermined time interval, comprises an operation panel operated for selecting the video and audio signals;

index denoting means for denoting an index by means of the operation of said operation panel;

means for extracting the first control signal having the same index as that denoted said index denoting means;

means for extracting the second control signal having the same index as that denoted by said index denoting means;

means for storing said extracted first control signal;

means for storing said extracted second control signal;

signal producing means for generating a signal for extracting from the composite signal the video and audio signals having the video identification and audio channel numbers, respectively denoted by said second control signal stored in said second control signal storing means;

means for reproducing said video and audio signals extracted by said signal generated from said signal producing means; and means for selecting one of the indexes included in said first control signal stored in said first control signal storing means by means of a command from said operation panel operated in accordance with information of said reproduced still picture and sound and supplying said selected index to said index denoting means to renew the index denoted by said index denoting means.

5. A receiver as claimed in claim 4, wherein each of said index denoting means, said first control signal extracting means, said second control signal extracting means, said first control signal storing means, said second control signal storing means and said signal producing means for generating said signal for extracting the video and audio signals denoted by said second control signal comprises a shift register and said receiver further comprises sequence control means for selectively supplying clock pulses to said shift registers in a predetermined sequence to operate all of said means in a predetermined sequence.

* * * * *